United States Patent [19]

Weber

[11] 4,018,037
[45] Apr. 19, 1977

[54] ATTACHING MEANS FOR CONVERTING A CONVENTIONAL HAND-HELD PORTABLE POWER TOOL OR APPLIANCE FOR STAND-UP USAGE

[75] Inventor: Edwin Joseph Weber, Baltimore, Md.

[73] Assignee: The Black and Decker Manufacturing Company, Towson, Md.

[22] Filed: Aug. 25, 1975

[21] Appl. No.: 607,636

[52] U.S. Cl. .............................................. 56/16.7
[51] Int. Cl.$^2$ ........................................ A01D 35/00
[58] Field of Search .................. 56/16.7, 16.9, 17.1, 56/17.5, 17.6, 3, 12.7, 15.6, 228, DIG. 9; 30/DIG. 5, 231, 194, 341, 276, 347; 200/157, 51 R, 61.58 R, 153 F

[56] References Cited
UNITED STATES PATENTS

| | | | |
|---|---|---|---|
| 3,221,481 | 12/1965 | Mattson et al. | 56/17.1 |
| 3,350,864 | 11/1967 | Sheps et al. | 56/16.9 |
| 3,561,199 | 2/1971 | Lay | 56/17.1 |
| 3,759,020 | 9/1973 | Simmons | 56/17.5 |

Primary Examiner—Louis G. Mancene
Assistant Examiner—James D. Hamilton
Attorney, Agent, or Firm—Leonard Bloom; Edward D. Murphy; Walter Ottesen

[57] ABSTRACT

A portable power tool or appliance, such as a cordless grass shear, may be slidably received within a unitary stirrup. A flexible flap on the stirrup carries a detent button that is automatically snapped into a screw-hole on the clam-shell power tool housing, as the power tool is fully seated within the stirrup. The flap may be flexed manually to release the detent button, thereby facilitating quick disengagement between the power tool and the stirrup. The stirrup carries ground-engaging wheels to facilitate manual movement and guidance of the power tool during its stand-up operation. An extension handle in the form of a tubular wand is secured to the stirrup and extends upwardly therefrom. A top handle with a switch is provided on the end of the wand. An electrical cable is connected to the switch, extends downwardly therefrom within the wand, and exits from the stirrup above the power tool. The end of the cable carries a plug adapted to be received within a receptacle on the power tool. The receptacle has spaced contacts formed as a continuation of the contacts of the tool switch. This provides a parallel connection, by-passing the tool switch and, at relatively low cost, facilitating manual control by the switch on the top handle.

9 Claims, 7 Drawing Figures

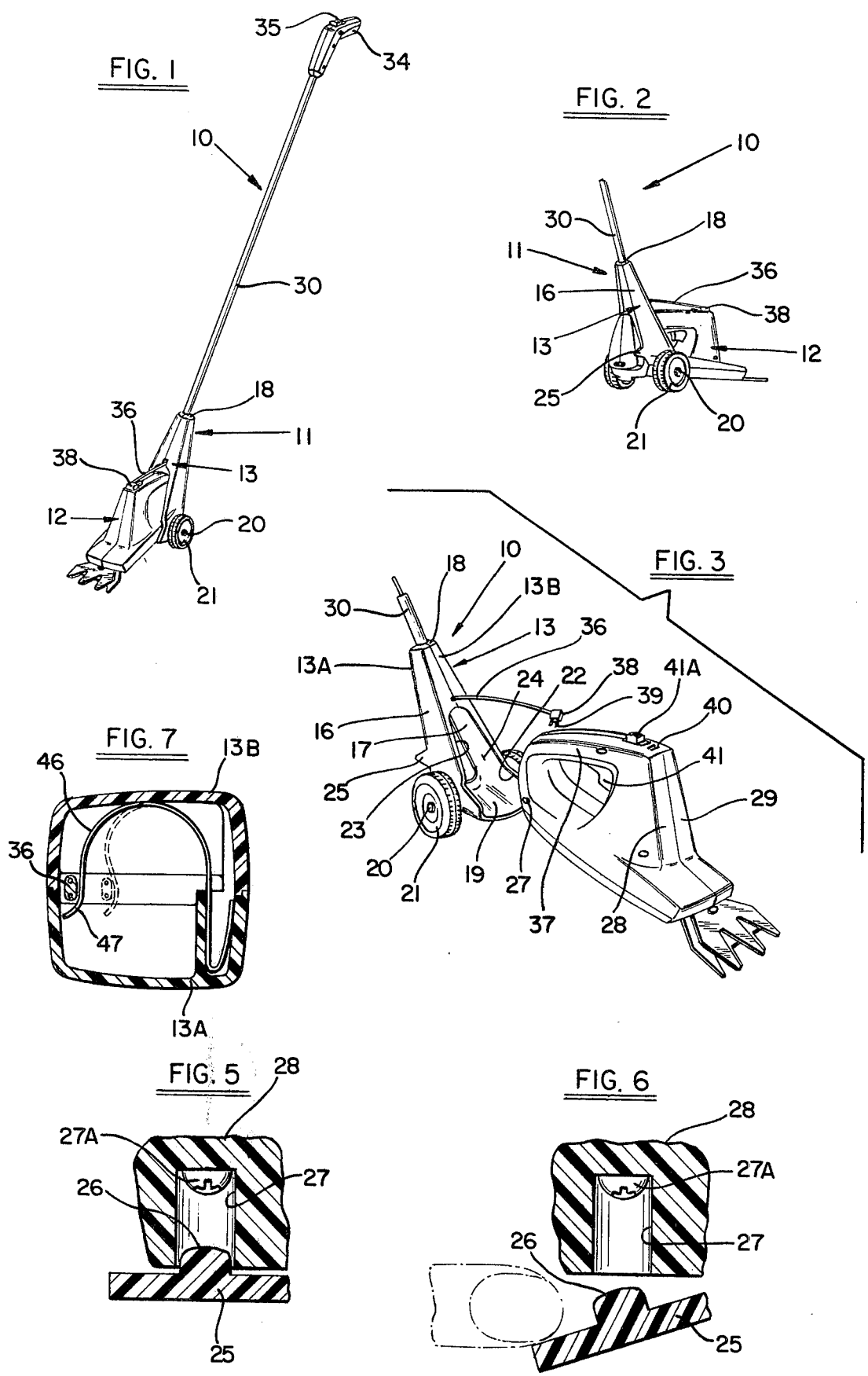

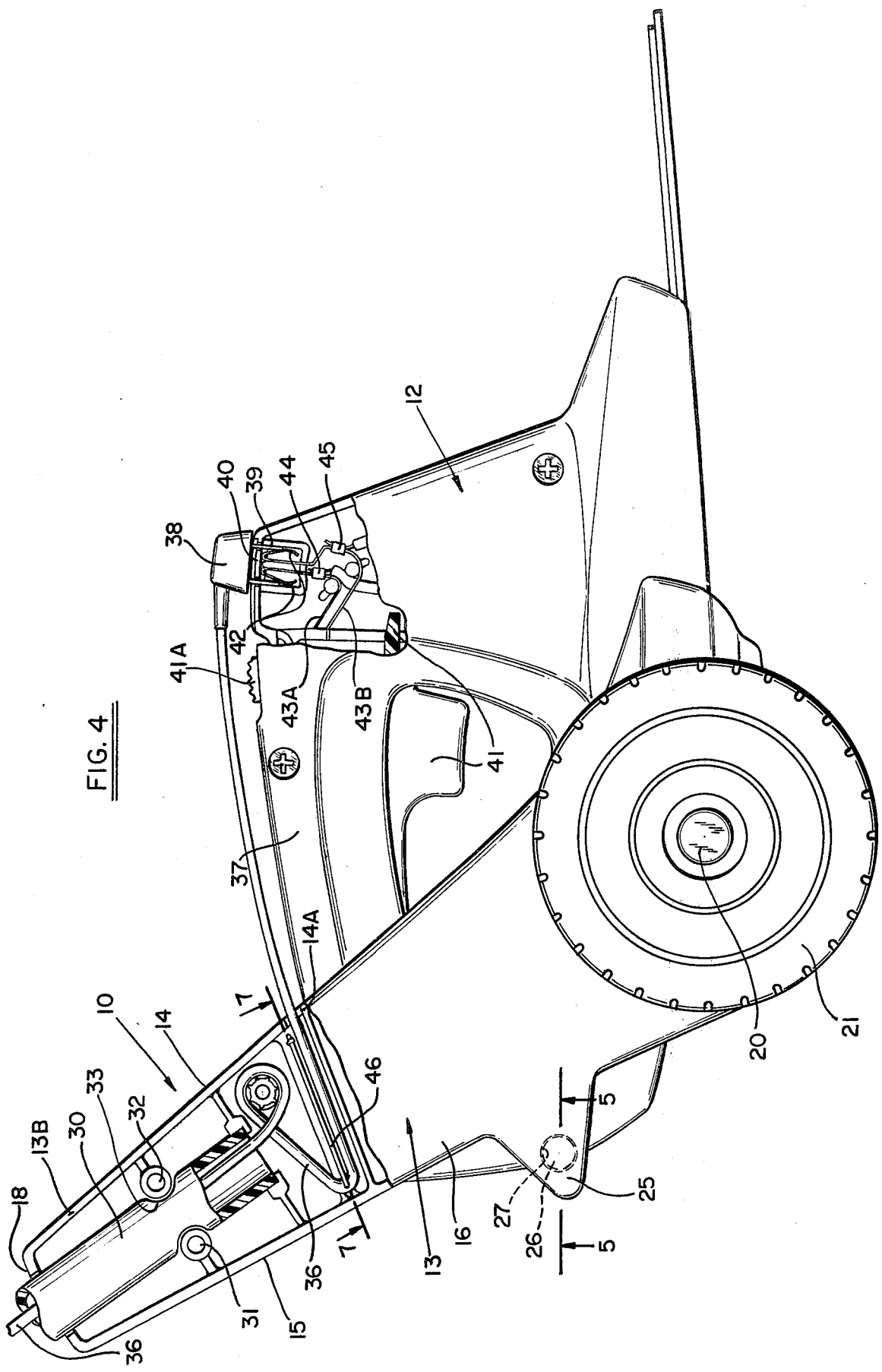

4,018,037

ATTACHING MEANS FOR CONVERTING A CONVENTIONAL HAND-HELD PORTABLE POWER TOOL OR APPLIANCE FOR STAND-UP USAGE

SYNOPSIS OF THE PRIOR ART

In the prior art, of which the applicant is aware, various attaching means have been provided for readily converting a conventional hand-held portable power tool or appliance for stand-up usage. The attaching means generally provides a frame, means for supporting a power tool on the frame, ground-engaging wheels carried by the frame, an upwardly-extending wand, and a handle on the end of the wand, thereby facilitating stand-up usage of the power tool.

For example, in the Grieder U.S. Pat. No. 2,629,220, a portable electric drill is received within horizontal strap-like extensions of a wheeled frame; the extensions are clamped together by means of a bolt, and the chuck of the drill is adapted to drive the mechanism of the attachment, thereby providing a stand-up device for clipping grass or the like.

Another example is the Garner, Sr. et al U.S. Pat. No. 2,932,144, wherein the drill is supported upon a cradle and is retained therein by means of a band that encircles the tool housing, the overall device being adapted for stand-up lawn-edging operations.

In the Simmons U.S. Pat. No. 3,759,020, the power tool is a cordless grass shear having self-contained rechargeable batteries. The bottom stationary blade of the cordless grass shear is provided with a rearwardly-extending sheet-metal tongue. This tongue is adapted to be slidably received within raised tabs formed on a wheeled sheet-metal supporting base. This base has a spring catch received within a slotted opening formed on the tongue, thereby retaining the shear on the base. The spring catch may be manually depressed to clear the slotted opening, thereby facilitating removal of the shear. Additionally, the top handle is provided with a switch, and an electrical cable is connected to the switch and extends downwardly therefrom within a tubular wand, the wand being connected to the base. The end of the cable is provided with a plug, and the plug is received within the conventional recharger receptacle of the cordless grass shear, thus bypassing the switch on the shear and facilitating manual control by means of the switch on the top handle.

OBJECTS OF THE PRESENT INVENTION

It is an object of the present invention to provide an attaching means for readily converting a conventional hand-held portable power tool or appliance for convenient stand-up usage, wherein rapid assembly and disassembly of the tool within the attaching means is readily facilitated, and wherein the attaching means substantially encloses a transverse intermediate section of the tool for good mechanical rigidity therebetween.

It is another object to provide an attaching means which is attractively styled, convenient and easy to use, and may be mass produced at a relatively low cost.

It is yet another object to provide an attaching means including a molded-plastic stirrup, which will flex slightly so as to snugly grip the power tool, and which will not mar or scratch the finish or appearance of the power tool due to repeated insertions of the power tool within the stirrup and removals therefrom.

It is a further object of the present invention to avoid the necessity for securing special sheet-metal tongues or attaching plates to a power tool, and in lieu thereof, to facilitate rapid assembly and removal of a standard power tool without modification thereof.

It is a still further object to provide an attaching means for a cordless power tool, wherein the attaching means includes a bypassing plug adapted to be received in a special low-cost receptacle formed in the tool housing, directly adjacent to the tool switch and having respective contacts formed as a continuation of the contacts for the tool switch, thereby avoiding the necessity for using the recharger receptacle, and thereby avoiding the necessity for a heavy-duty diode rectifier as well as additional wire-up from the recharger receptacle.

These and other objects of the present invention will become apparent from a reading of the following specification, taken in conjunction with the enclosed drawings, in which:

FIG. 1 is a front perspective of the overall stand-up device including the attaching means for a conventional hand-held portable power tool;

FIG. 2 is a fragmentary rear perspective of the overall stand-up device of FIG. 1;

FIG. 3 is an exploded perspective, drawn to an enlarged scale, and showing the manner in which the rear portion of the power tool is slidably received within a recess formed in a stirrup portion of the attaching means.

FIG. 4 is a side elevation of the power tool received within the stirrup of the attaching means, with certain parts being broken away and sectioned;

FIG. 5 is a section view, taken across the lines 5—5 of FIG. 4, to an enlarged scale, and showing the detent means for retaining the power tool within the stirrup;

FIG. 6 is a section view, corresponding to FIG. 5, but showing the manner in which the detent means may be manually released to enable the power tool to be removed from the stirrup; and FIG. 7 is a section view, taken along the lines 7—7 of FIG. 4, showing a wire spring for taking up the slack on the end of the electrical cable and maintaining it substantially taut.

With reference to FIGS. 1 and 2, the overall device 10 comprises an attaching means 11 for a conventional hand-held portable power tool, thereby facilitating convenient stand-up usage of the power tool. In a preferred embodiment, the power tool comprises a cordless grass shear 12 having self-contained rechargeable batteries (not shown). However, other tools, appliances, or portable devices may be used consonant with the teachings of the present invention.

With reference to FIGS. 3 and 4, the attaching means comprises a stirrup 13 having a front wall 14, rear wall 15, respective side walls 16 and 17, a top wall 18, and a bottom wall 19. The junction of the bottom wall with the respective side walls is provided with bosses (not shown) for mounting respective axles 20 for the pair of ground-engaging wheels 21, thereby facilitating the manual movement and guidance of the overall device for stand-up usage. Preferably, the stirrup is made from a suitable plastic material for relatively low-cost manufacture, and comprises injection-molded mating "clam shell" portions 13a and 13b secured together.

As shown more clearly in FIG. 3, the front wall of the stirrup has an opening 22, which is generally aligned with an opening 23 in the rear wall. These openings 22 and 23 are shaped to conform substantially to the transverse outer contours of respective corresponding intermediate portions of the cordless grass shear 12. Thus, the stirrup is provided with a continuous inner recess 24 shaped to conform to the outer transverse contours of an intermediate portion of the cordless grass shear 12. The rear portion of the shear may be readily inserted within the front of the stirrup, as shown in FIG. 3, with the shear being supported upon the bottom wall of the stirrup. Thus the shear is cradled within the stirrup (and is substantially enclosed therein) for good mechanical rigidity therebetween. Preferably, a semi-flexible plastic material is employed, such as polyethylene or polypropylene so that the stirrup will flex to hold the shear snugly. In addition, use of this plastic material avoids any marring or scratching of the outer finish or appearance of the shear, which might otherwise occur as a result of the repeated insertions and removals of the shear from the stirrup.

With reference again to FIG. 4, and with further reference to FIG. 5, the rearmost portion of the shear protrudes beyond the opening in the rear wall of the stirrup. A flexible tab 25 is formed integrally with side wall 16 of the stirrup and extends rearwardly therefrom. A detent button 26 is formed integrally with the tab and extends therefrom towards the recess in the stirrup. As the shear is slidably received within the recess in the stirrup, and substantially fully inserted therein, the detent button 26 rides up over the outer contour of the housing for the shear and snaps into a screw-hole 27, thereby retaining the shear within the stirrup. This screw-hole 27 is one of several such access openings and is normally provided to enable the 'clam shell' housing members 28 and 29 of the shear to be secured together by recessed screws 27a (or other fasteners).

With reference to FIG. 6, the tab 25 is sufficiently flexible or resilient to enable the user to lift the detent button 26 clear of the screw-hole 27, thereby enabling the user to slidably remove the shear from the stirrup. Thus a quick-disconnect retention means is provided (at a relatively low cost) between the shear and its stand-up attaching means.

With reference again to FIG. 4, a tubular wand 30 is received within the top portion of the stirrup, and is retained against upward movement by means of integrally-formed bosses 31 and 32 received within a necked-down portion 33 of the wand. A top handle 34 is secured on the end of the wand, as shown in FIG. 1, to facilitate the manual guidance and movement of the stand-up device. A switch means 35 is carried by the top handle, and an electrical cable 36 is connected to the switch means and extends downwardly therefrom within the tubular wand. The lower end of the cable exits through an opening 14a in the front wall 14 of the stirrup, above the handle 37 of the cordless grass shear. A male plug 38 is carried on the end of the cable and is provided with prongs 39. A female receptacle 40 is formed on the handle 37, adjacent to the conventional switch for the shear. The switch on the shear includes a trigger 41 and a locking means 41A, the details for which are described and claimed in detail in the Beckering et al U.S. Pat. No. 3,780,246 issued Dec. 18, 1973, and assigned to the assignee of the present application. The receptacle 40 is provided with a pair of spaced spring-type electrical contacts 42 for engaging the prongs 39 of the plug. These contacts 42 are formed as continuations of the switch contacts 43A and 43B in the shear; one of the contacts (43A) is stationary and the other (43B) is movable and is engaged by the trigger 41 in the normal hand-held operation of the shear. The contacts 42 in the receptacle, as well as the switch contacts 43A and 43B are thus in parallel and are connected to the electrical circuit of the shear by means of connectors 44 and 45. In this low-cost manner, the switch in the shear is bypassed to facilitate manual control of the stand-up device by the switch means 35 on the top handle 34.

The switch bypassing is accomplished by connecting the plug directly into extensions of the conventional switch contacts for the cordless tool. In the prior art, the bypassing plug has been connected into the conventional recharger receptacle. Thus the prior art required additional wire-up as well as a heavier duty diode rectifier in the cordless tool. The present invention thus facilitates an attaching means including an extension handle for stand-up usage, quickly attached and quickly removable, without requiring any substantial changes in the cordless tool, thereby providing an improved product at lower manufacturing costs.

With reference again to FIG. 4, and with further reference to FIG. 7, a wire spring 46 (or other suitable resilient means) is trapped in the upper portion of the stirrup 13 (between the complementary mating halves 13A and 13B thereof) and has a free end 47 which engages the cable 36 and provides tension on the cable to take up the slack. Thus, the plug end of the cable (as shown in FIG. 4) is maintained substantially taut for improved appearance and convenience to the user.

Obviously, many modifications may be made without departing from the basic spirit of the present invention; and therefore, within the scope of the appended claims, the invention may be practiced other than has been specifically described.

I claim:

1. In attaching means for converting a conventional hand-held portable-power tool or appliance to provide a device for convenient stand-up usage, wherein the attaching means for retaining the tool has an upwardly-extending wand means, and wherein a top handle provided with switch means is secured to the wand means, and electrical cable means is connected to the switch means and extends downwardly therefrom, the improvement in electrical connection means between the switch means and the tool, which comprises plug means formed on the end of the electrical cable means, receptacle means formed on the tool housing for receiving the plug, a pair of spaced electrical contacts in the receptacle means for engaging the plug means, a second pair of electrical contacts in the tool housing, one of which is stationary and the other of which is movable and is normally engaged by a switch operating member on the tool, means connecting the pair of contacts in the receptacle means in parallel with the respective pair of switch contacts, thereby bypassing the tool switch and facilitating manual control of the stand-up device by the switch means on the top handle, and resilient means in the attaching means for taking up the slack on the end of the electrical cable means and maintaining it substantially taut.

2. The attaching means of claim 1 wherein one of the electrical contacts of said first-mentioned pair of electrical contacts and one of the electrical contacts of said second pair of electrical contacts conjointly defining an integral elongated first resilient member, and the other one of the electrical contacts of said first-mentioned pair of electrical contacts and the other one of said second pair of electrical contacts conjointly defining an integral elongated second resilient member.

3. Attaching means for readily converting a conventional hand-held portable cordless power tool or appliance for stand-up usage, the tool having an overhead handle provided with a switch, and the tool housing having an annular rearward portion with an access opening formed therein, the attaching means comprising a stirrup having a bottom wall, front and rear walls, and respective side walls, the front wall having an opening formed therein, and the rear wall also having an opening formed therein, the respective openings in the front and rear walls being generally aligned and being shaped to substantially conform to the transverse outer contours of respective corresponding intermediate portions of the tool, by which the rear portion of the tool may be readily inserted within the front wall of the stirrup, with the tool being supported upon the bottom wall of the stirrup, and the rearmost portion of the tool protruding beyond the opening in the rear wall of the stirrup, a tab extending rearwardly from a side wall of the stirrup, a detent button carried by the tab and extending within the stirrup towards the other side wall thereof, by which the detent button is automatically received within the access opening in the tool housing upon substantial insertion of the tool within the stirrup, thereby retaining the tool within the stirrup, the tab being sufficiently flexible to enable manual release of the detent button from the access opening in the tool housing, thereby facilitating quick removal of the tool from the stirrup, ground-engaging wheels carried by the lower portion of the stirrup, an elongated tubular wand secured to the stirrup and extending upwardly therefrom, a top handle secured on the end of the wand, thereby facilitating the manual guidance and movement of the tool, switch means carried by the top handle, an electrical cable connected to the switch means and extending downwardly therefrom within the wand, the lower end of the cable extending through the stirrup, a plug carried by the end of the cable, a receptacle on the tool handle, adjacent to the tool switch, and having spaced electrical contacts for receiving the plug, and a parallel electrical connection means between the receptacle contacts and the normal contacts of the tool switch, thereby bypassing the switch and facilitating manual control of the tool by the switch means on the top handle.

4. The attaching means of claim 3, further including resilient means in the stirrup for taking up the slack on the plug end of the electrical cable and maintaining it taut.

5. Attaching means for readily converting a conventional hand-held portable cordless power tool or appliance for stand-up usage, comprising:
 a unitary annular stirrup having an inner wall defining the stirrup opening, said inner wall having a continuous surface shaped to conform to the outer transverse contours of an intermediate portion of the tool housing by which the tool may be slidably received within the stirrup opening and be substantially enclosed by said inner wall with substantial mechanical rigidity between the tool and the stirrup; detent means formed on the tool and said stirrup for manually releasable detenting the tool in said stirrup;
 ground-engaging wheels carried by the lower portion of the stirrup;
 an elongated wand secured to the stirrup and extending upwardly therefrom;
 a top handle secured on the end of the wand;
 switch means carried by the top handle;
 an electrical cable connected to the switch means and extending downwardly therefrom within the wand, the lower end of the cable passing through the stirrup, above the tool, and having a plug formed on the end thereof;
 receptacle means on the tool for receiving the plug; and,
 parallel electrical connection means between the receptacle means and the conventional switch on the tool.

6. Attaching means for readily converting a conventional hand-held portable cordless power tool or appliance for stand-up usage, the tool having a housing of the clam-shell type and having at least one access opening formed in a wall thereof for receiving a conventional fastener, the attaching means comprising an annular stirrup having an inner wall defining the stirrup opening, said inner wall being shaped to conform to the outer transverse contours of a portion of the tool housing by which the tool may be slidably received within the stirrup, a tab formed integrally with a wall of the stirrup, a detent button carried by the tab and adapted to be received within the access opening in the housing wall upon the substantial insertion of the tool within the stirrup, the tab being manually releasable, thereby providing a quick-release retaining means between the stirrup and the tool, ground-engaging wheels carried by the lower portion of the stirrup, an elongated wand secured to the stirrup and extending upwardly therefrom, a top handle secured on the end of the wand, switch means carried by the top handle, an electrical cable connected to the switch means and extending downwardly therefrom, the lower end of the cable having a plug formed on the end thereof, receptacle means on the tool for receiving the plug, and parallel electrical connection means between the receptacle means and the conventional switch on the tool.

7. Attaching means for readily converting a conventional hand-held portable cordless power tool or appliance for stand-up usage, the tool having a housing including an overhead handle provided with a switch, the attaching means comprising annular stirrup means for surroundingly engaging a portion of the housing and holding the tool with substantial mechanical rigidity therebetween, manually-operative retaining means between the tool and the stirrup means, ground-engaging wheels carried by the stirrup means, an elongated wand secured to the stirrup means and extending upwardly therefrom, a top handle secured on the end of the wand, switch means carried by the top handle, an electrical cable connected to the switch means and extending downwardly therefrom within the wand, the lower end of the cable passing through the stirrup, directly above the overhead handle of the tool, a plug formed on the end of the cable, a receptacle on the tool handle, adjacent to the tool switch, for receiving the plug, and parallel electrical connection means between the receptacle and the conventional switch on the tool.

8. In attaching means for readily converting a conventional hand-held portable power tool or appliance for stand-up usage, the improvement which comprises an integrally-molded plastic stirrup having a bottom wall, front and rear walls, and respective side walls, the front wall having an opening formed therein, and the rear wall also having an opening formed therein, the respective openings in the front and rear walls being generally aligned and being shaped to substantially conform to the transverse outer contours of respective corresponding intermediate portions of the tool, by which the rear portion of the tool may be readily inserted within the front wall of the stirrup, the tool being supported upon the bottom wall of the stirrup, and the rearmost portion of the tool protruding beyond the opening in the rear wall of the stirrup, an integrally-molded tab extending rearwardly from a side wall of the stirrup, a detent button formed integrally with the tab and extending towards the other side wall of the stirrup, by which the detent button is automatically received within a screw-hole formed in an adjacent wall of the tool housing upon substantial insertion of the tool within the stirrup, thereby retaining the tool within the stirrup, and the tab being sufficiently resilient to enable manual release of the detent button from the tool housing, thereby providing a quick-disconnect retention means between the tool and the stirrup.

9. In attaching means for converting a conventional hand-held portable-power tool or appliance to provide a device for convenient stand-up usage, the tool having a switch including an operating member for actuating the switch, wherein the attaching means for retaining the tool has an upwardly-extending wand means, and wherein a top handle provided with switch means is secured to the wand means, and electrical cable means is connected to the switch means and extends downwardly therefrom, the improvement in electrical connection means between the switch means and the tool, which comprises; a male plug formed on the end of the electrical cable means, the plug having at least one pair of prongs; a female receptacle formed on the tool housing, directly adjacent to the tool switch, for receiving the plug, a pair of spaced electrical contacts in the receptacle for engaging the prongs on the plug, said receptacle contacts being formed as respective continuations of a pair of contacts of the switch of the tool, one of which is stationary and the other of which is movable and is normally engaged by the operating member of the switch on the tool, thereby bypassing the tool switch and facilitating manual control of the stand-up device by the switch means on the top handle when said receptacle is engaged by said plug.

* * * * *